(12) United States Patent
Foonberg

(10) Patent No.: US 11,813,210 B1
(45) Date of Patent: *Nov. 14, 2023

(54) TRANSPORT CHAIR ARRANGED FOR STORAGE IN PASSENGER AIRCRAFT CARRY-ON LUGGAGE

(71) Applicant: Jay Foonberg, Beverly Hills, CA (US)

(72) Inventor: Jay Foonberg, Beverly Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/844,477

(22) Filed: Jun. 20, 2022

Related U.S. Application Data

(63) Continuation of application No. 17/487,572, filed on Sep. 28, 2021, now Pat. No. 11,364,163.

(51) Int. Cl.
| | | |
|---|---|---|
| *A61G 5/08* | (2006.01) | |
| *A61G 5/10* | (2006.01) | |
| *A61G 5/12* | (2006.01) | |

(52) U.S. Cl.
CPC .......... *A61G 5/0875* (2016.11); *A61G 5/0816* (2016.11); *A61G 5/0883* (2016.11); *A61G 5/1083* (2016.11); *A61G 5/125* (2016.11); *A61G 2220/10* (2013.01)

(58) Field of Classification Search
CPC .. A61G 5/0875; A61G 5/0883; A61G 5/1083; A61G 5/125; A61G 5/0816; A61G 5/0825; A61G 2220/10; A47C 4/283
See application file for complete search history.

(56) References Cited

U.S. PATENT DOCUMENTS

| | | |
|---|---|---|
| 2,133,540 A | 10/1938 | Jacobs |
| 2,379,566 A | 7/1945 | Duke |
| 2,485,016 A | 10/1949 | Rideout |
| 2,621,711 A | 12/1952 | Leslie et al. |
| 2,675,057 A | 4/1954 | Glass |
| 2,859,800 A | 11/1958 | Jennings, Jr. |
| 2,914,111 A | 11/1959 | Mize |
| 2,959,212 A | 11/1960 | Bauer |
| 3,021,889 A | 2/1962 | Mize |
| 3,228,724 A | 1/1966 | Resar |
| 3,730,584 A | 5/1973 | Uchida |
| 3,838,869 A | 10/1974 | Falkenberg |
| 3,968,991 A | 7/1976 | Maclaren |
| 4,045,051 A | 8/1977 | Igarashi et al. |
| 4,140,341 A | 2/1979 | Rabe |
| 4,164,354 A | 8/1979 | Rodaway |
| 4,457,535 A | 7/1984 | Takeuchi et al. |
| 4,515,383 A | 5/1985 | Minnebraker |
| 4,595,212 A | 6/1986 | Haury et al. |
| 4,648,619 A | 3/1987 | Jungnell et al. |

(Continued)

*Primary Examiner* — Emma K Frick
(74) *Attorney, Agent, or Firm* — GableGotwals

(57) ABSTRACT

A transport chair of this disclosure includes a frame having a pair of fixed sides and hinged sides, the frame moveable between stowed and deployed states. The frame includes wheel receiving means and armrest and push handle assemblies receiving means with quick connect-disconnect clamps or pins. A bar, which is connectable to, and detachable from, each hinge extends between the pair of hinged sides. When connected to the hinged sides, the bar locks the frame in the deployed state and prevents the frame from moving to the stowed state. The chair may be quickly assembled and then dissembled for storage without the need for tools. When dissembled, the transport chair fits within an envelope 9 inches deep×14 inches wide×22 inches long.

19 Claims, 10 Drawing Sheets

(56) References Cited

U.S. PATENT DOCUMENTS

| | | |
|---|---|---|
| 4,741,547 A | 5/1988 | Tholkes |
| 4,770,467 A | 9/1988 | Zinn |
| 4,861,056 A | 8/1989 | Duffy et al. |
| 4,874,084 A | 10/1989 | Strausser |
| 5,076,390 A | 12/1991 | Haskins |
| 5,188,383 A | 2/1993 | Thompson |
| 5,558,358 A | 9/1996 | Johnson |
| 5,782,483 A | 7/1998 | Rogers et al. |
| 5,857,688 A | 1/1999 | Swearingen |
| 6,079,725 A | 6/2000 | Lazaros |
| 6,135,222 A | 10/2000 | Furukawa |
| 6,164,674 A | 12/2000 | Rogers et al. |
| 6,270,105 B1 | 8/2001 | Friedrich |
| 6,302,429 B1 | 10/2001 | Friedrich |
| 6,467,788 B1 | 10/2002 | Li et al. |
| 6,540,290 B2 | 4/2003 | Liu |
| 6,616,172 B1 | 9/2003 | Cockram |
| 7,077,422 B2 | 7/2006 | Haury et al. |
| 7,152,515 B1 | 12/2006 | Greenlee |
| 7,384,058 B2 | 6/2008 | Munsey et al. |
| 7,597,339 B2 | 10/2009 | Furusho |
| 7,607,725 B2 | 10/2009 | Dickie et al. |
| 7,669,881 B2 | 3/2010 | Haury et al. |
| D618,141 S | 6/2010 | Chan |
| 7,988,171 B2 | 8/2011 | Chong |
| 8,322,784 B2 | 12/2012 | Ayre et al. |
| 8,419,047 B2 | 4/2013 | Chen |
| 8,454,048 B1 | 6/2013 | Regan et al. |
| D699,160 S | 2/2014 | Yang |
| 9,375,370 B2 | 6/2016 | Horacek |
| 9,572,733 B1 | 2/2017 | Lai et al. |
| 9,629,763 B2 | 4/2017 | Thompson |
| 9,642,756 B2 | 5/2017 | Lauret et al. |
| 9,655,794 B2 | 5/2017 | Bednarz, III et al. |
| 10,064,769 B2 | 9/2018 | Thompson |
| 10,399,588 B1 | 9/2019 | Grantham, IV |
| 10,980,686 B2 | 4/2021 | Doring et al. |
| 2002/0127944 A1 | 9/2002 | Spector |
| 2004/0021298 A1 | 2/2004 | Tsai |
| 2005/0057021 A1 | 3/2005 | Miyoshi |
| 2005/0077760 A1 | 4/2005 | Smith |
| 2005/0248143 A1 | 11/2005 | Sato |
| 2007/0145723 A1 | 6/2007 | Kamara |
| 2007/0257484 A1 | 11/2007 | Schindel |
| 2008/0093821 A1 | 4/2008 | Menichini |
| 2008/0238041 A1 | 10/2008 | Chen |
| 2009/0100769 A1 | 4/2009 | Barrett et al. |
| 2011/0006494 A1 | 1/2011 | Walker |
| 2011/0240380 A1 | 10/2011 | Zhao et al. |
| 2011/0291387 A1 | 12/2011 | Chang Liao |
| 2012/0007341 A1 | 1/2012 | Masaki |
| 2013/0202254 A1 | 8/2013 | Gurreri |
| 2016/0106606 A1 | 4/2016 | Eddy et al. |
| 2016/0270989 A1 | 9/2016 | Yentzer et al. |
| 2016/0325585 A1 | 11/2016 | Hays et al. |
| 2017/0105070 A1 | 4/2017 | O'Polka |
| 2017/0281437 A1 | 10/2017 | Itano |
| 2018/0023309 A1 | 1/2018 | Brawner et al. |
| 2018/0042794 A1 | 2/2018 | Itano |
| 2018/0042795 A1 | 2/2018 | Itano |
| 2018/0168898 A1 | 6/2018 | Foonberg et al. |
| 2018/0221242 A1 | 8/2018 | Lee et al. |
| 2018/0296408 A1 | 10/2018 | Sato |

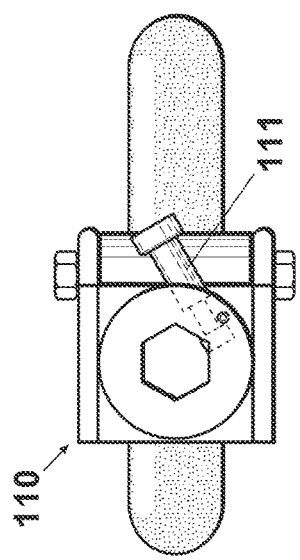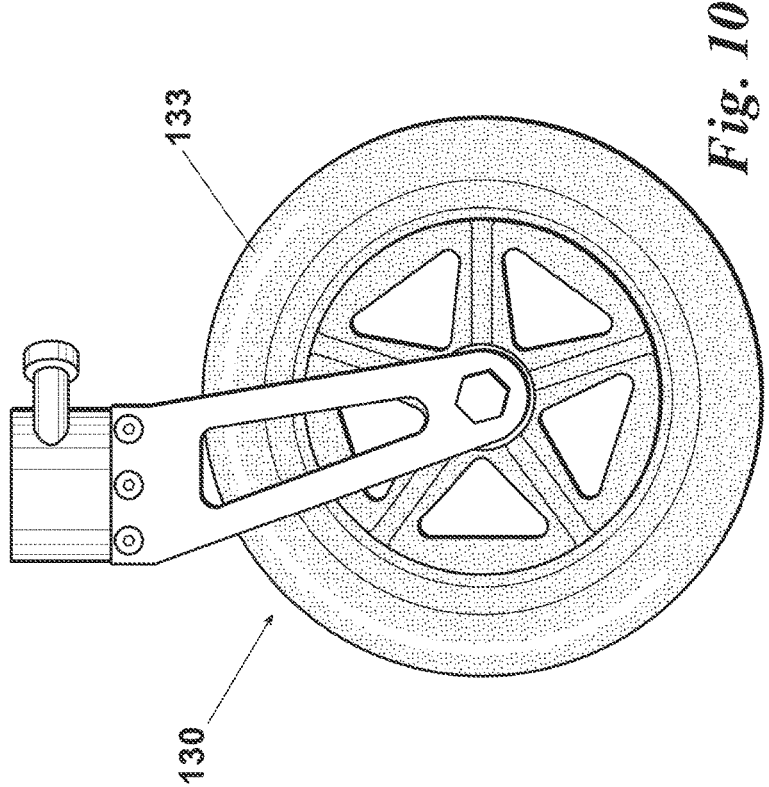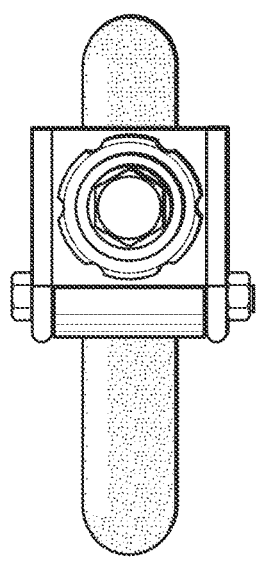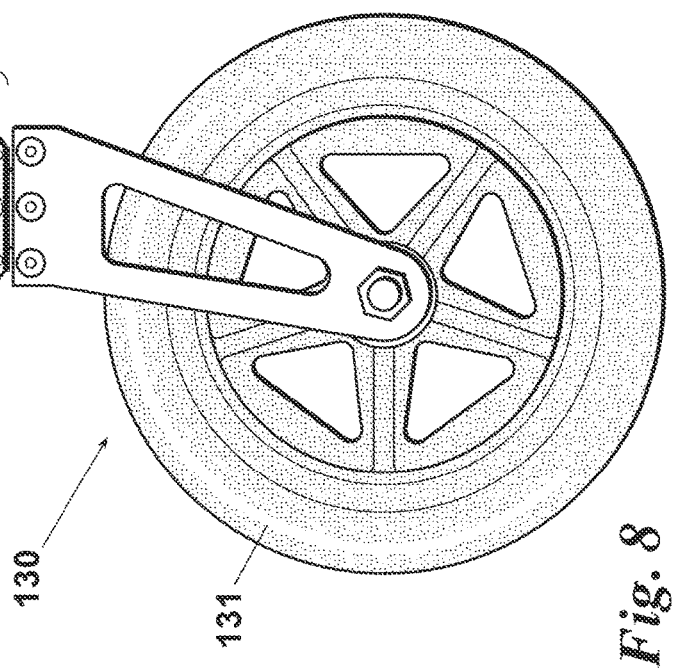

TRANSPORT CHAIR ARRANGED FOR STORAGE IN PASSENGER AIRCRAFT CARRY-ON LUGGAGE

CROSS-REFERENCE TO CO-PENDING APPLICATIONS

This application claims priority to U.S. application Ser. No. 17/487,572 filed Sep. 28, 2021.

BACKGROUND

The present disclosure relates to transport chairs and, more particularly, a transport chair that can be provided in parts that can be easily assembled and disassembled without the need for tools. The disassembled parts can be stored and carried as a relatively small package, for example, all of the dissembled parts may be stowable in a carry-on bag having dimensions no larger than 9 inches deep×14 inches wide×22 inches long (22 centimeters×35 centimeters×56 centimeters).

Transport chairs in general and wheelchairs in particular tend to be large with accessories and, in some instances, can be motorized. Such chairs are used for disabled persons or medical patients who may be unable to walk comfortably or are easily fatigued by walking.

Wheelchairs are conventionally constructed with a pair of large rear wheels accessible to the user and a pair of smaller front wheels that swivel. The large rear wheels can be manipulated by the occupant of the chair or the chair may be pushed by another person. Some wheelchairs are designed to collapse axially, resulting in a narrower volume that can be stored or transported. However, wheelchairs are difficult to stow and can be quite heavy and difficult to maneuver during storage.

Unlike wheelchairs, transport chairs do not have the pair of large rear wheels and usually require assistance from another person to push the chair. Some however permit the user, while seated, to propel the chair with their feet. While transport chairs are lighter and easier to store than wheelchairs, neither type of chair folds compactly enough to stow in carry-on luggage which meets passenger aircraft guidelines. If checked as baggage by airlines, the chair is subject to the luggage handling treatment normally afforded checked baggage and may be damaged as a result. Unless especially designed to be accommodated by passenger aircraft, a transport chair may not be provided when on the aircraft.

Although passage of the Americans with Disabilities Act ("ADA") has required public facilities to be accessible to transport chairs, a great many activities are still beyond the convenient reach of persons with debilitating conditions. What is needed is a transport chair where:

1. No moving parts are required to assemble or collapse;
2. No tools are needed to collapse or assemble the chair;
3. Less than 15 parts must be "snapped" or fitted together with no springs or catches;
4. Numbered, color-coded or otherwise associated parts are not interchangeable, thus making it impossible to misconnect any pieces;
5. No physical strength is required to assemble or collapse the chair (e.g., a senior citizen with severe arthritis and very little finger mobility should be able to assemble and collapse the chair);
6. No higher-order thinking skills are needed to assemble or collapse the chair, just an ability to match numbered, color-coded, or otherwise associated parts to their mating part;
7. The chair and its carrying case together will fit within both the weight (e.g. less than 22 pounds, less than 15 pounds) and size limitations of most airlines for carry-on baggage, meaning the chair is not subjected to airline baggage handling systems and the chair will never be outside of sight or possession of its user;
8. The chair and its carrying case together fit into the trunk or back seat of the smallest compact and sports cars, and may be stowed under a bed;
9. The chair may be brought anywhere, for example, on a cruise ship where staff only provides assistance with getting a person in need of transport on or off the ship but do not provide chairs when on the ship; and
10. Serves other purposes, such as but not limited to a stroller for small children, making travel easier for parents who would otherwise travel with bulky strollers.

US 2018/0168898 A1 to Foonberg et al. discloses a kit of parts that when assembled provide a wheeled chair and include a central frame member to which all of the parts are connected. However, assembly and disassembly depend upon quick connect/disconnect locking pins. For example, the central frame member includes two front and two rear cross members connected by locking pins to left and right rigid (fixed) frame units. Because each cross member of the front two cross members is independent of the other, four locking pins must be used to connect the cross members to the rigid frame. The same is true of the rear cross members. Although the disassembled chair can fit into a carrying case, the chairs assembly and disassembly is not as fast or as user friendly as it could be.

SUMMARY

In embodiments of this disclosure, a kit of parts is created which, when assembled, result in a wheeled chair of a size that can transport an adult but is easily accommodated when in a stowed state by most passenger aircraft, buses, vans and other vehicles. The individual parts may be constructed of tubing which may be square, rectangular, circular, or some combination thereof. The parts may mate with one another telescopically and may include indexing features that avoid the possibility of a mismatch. By way of a non-limiting example, round tubing may be used with reduced diameters for the male end that is to fit into the female end. Printed or etched lines may be used to gauge the extent of insertion. Splines and grooves may be utilized to assure that apertures in the mated parts are aligned.

Embodiments of a transport chair of this disclosure include a frame having a first fixed side and a second fixed side, each fixed side arranged opposite one another and defining a first dimension of the frame, the first dimension being a same size when the frame is in the stowed state and the deployed state; a first hinged side and a second hinged side, each hinged side arranged opposite one another, pivotally mounted to a corresponding one of the fixed sides, and defining a second dimension of the frame, the second dimension being a different size when the frame is in the stowed state than when it is in the deployed state. The frame may also include wheel receiving means located at a lowest end of the frame; and armrest assembly receiving means located at a highest end of the frame.

The first and second hinge sides of the frame each include a pair of cross-members; and a hinge located between the pair of cross-members, each hinge arranged such that its corresponding cross-members fold inwardly relative to the frame. The cross-members of the first hinged side are inverted relative to the cross members of the second hinged side and arranged such that when the frame is in the stowed state, a portion of the first hinged side overlaps a corresponding portion of the second hinged side.

The chair also includes a bar that extends between the first and second hinged sides and is connectable to, and detachable from, each hinge. The bar has a first end at a first elevation and a second end at a second elevation different than that of the first elevation, such that the ends meet with corresponding hinges of the hinge sides (whose cross-members are inverted relative to those of the other hinge side). When the bar is connected to the first and second hinged sides, the frame is locked in the deployed state.

Quick release clamps or spring-loaded pins may be used to assist with assembly and disassembly. However, assembly and disassembly do not require the use of the quick connect/disconnect locking pins of US 2018/0168898 A1 to Foonberg et al.

The chair, when in its disassembled and stowed state, fits within an envelope 9 inches deep×14 inches wide×22 inches long. The total weight of the chair may be in a range of 15 to 22 pounds and, in some embodiments, no greater than 15 pounds. The frame may be stowed in baggage separately from that containing the armrest, push handles, and wheels. In some embodiments, the chair may include footrests connectable to, and detachable from, the frame and stowed along with the dissembled chair. Quick connect/disconnect clamps may be used to connect the footrests to the frame. One or more motors, and a power source, may be provided to drive the wheels.

Embodiments of a chair of this disclosure permit persons who require a transport or wheel chair to more easily travel out of their residences and into the world. Because of its compact size, a higher quantity of chairs can be shipped to disaster sites or warehoused for deployment to disaster sites.

The novel features which are characteristic of embodiments of this disclosure, both as to structure and method of operation thereof, together with further objects and advantages thereof, will be understood from the following description, considered in connection with the accompanying drawings, in which the preferred embodiment of the invention is illustrated by way of example. The drawings are for the purpose of illustration and description only, and they are not intended as a definition of the limits of the claimed invention.

BRIEF DESCRIPTION OF THE DRAWINGS

FIG. 8 is a side elevation view of the front, swiveling, wheels of FIG. 1.

FIG. 9 is a top plan view of the wheel receiving means for the front wheels.

FIG. 10 is a side elevation rear, fixed, wheels of FIG. 1.

FIG. 11 is a top plan view of the wheel receiving for the rear wheels.

ELEMENTS AND NUMBERING USED IN THE DRAWINGS AND DETAILED DESCRIPTION

Figure 1:
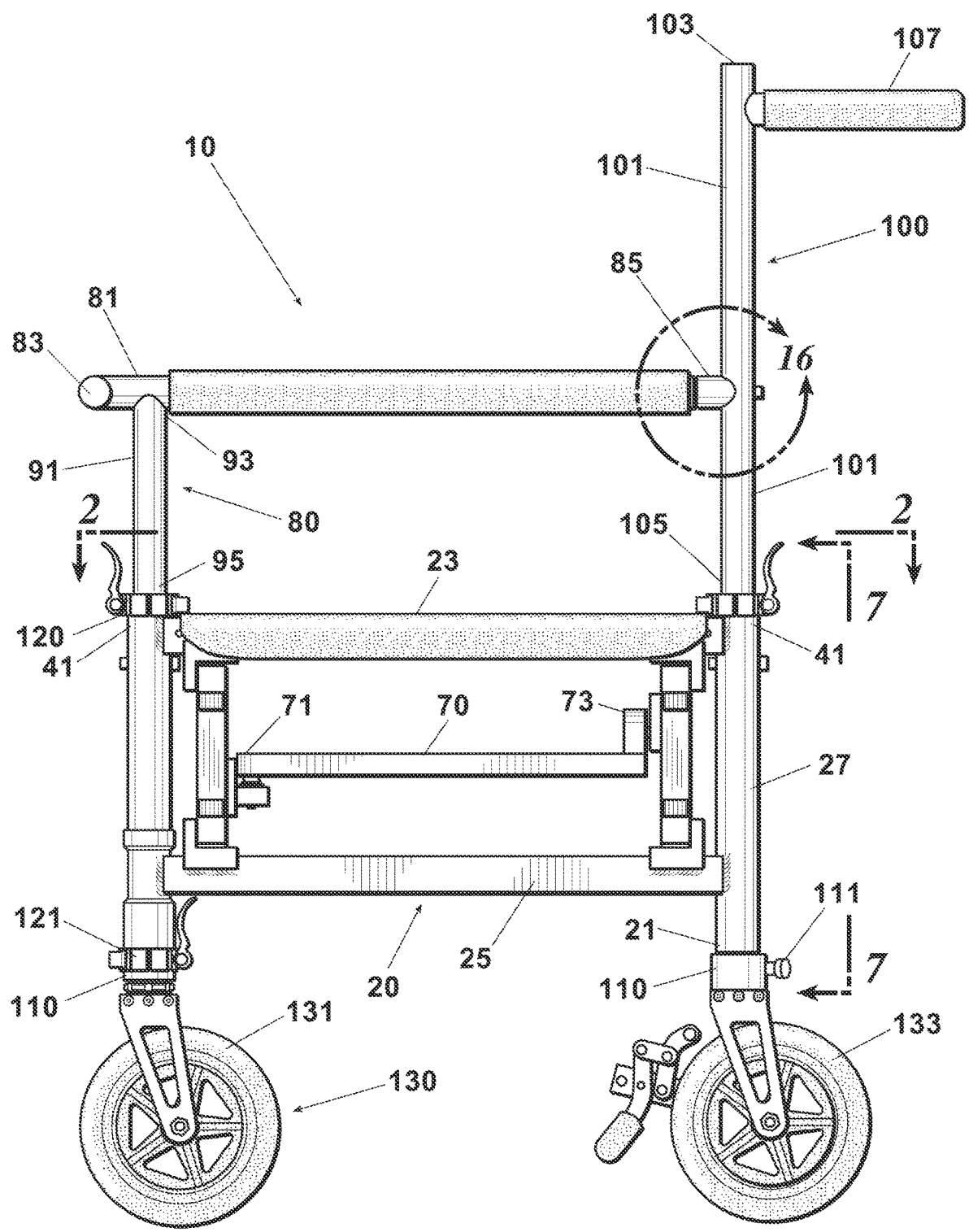
FIG. 1 is a side elevation view of an assembled chair according to the present disclosure, the opposite side being a mirror image thereof, a locking bar connecting the hinged sides of the frame and preventing their collapse.

10 Transport chair
20 Frame
21 Lowest end
23 Seat panel
25 Fixed side
27 Vertical support member
29 Horizontal rail
35 Hinged side
37 Uppermost end
39 Lowermost end
41 Highest end
43 Hinge
45 Connecting means
47 Pin
50 Cross-member
51 Support
53 First end
55 Second end
57 Portion
61 Shorter leg
63 Longer leg
67 Spaces
69 Perimeter
70 Bar
71 First end
73 Second end
75 Connecting means 77 Pin receiver
79 Step
80 Armrest assembly
81 Horizontal member
83 Forwardmost end
85 Rearmost end
87 Slot
89 Open bottom
91 Vertical support member
93 Uppermost end
95 Lowermost end
97 T-shaped connector
100 Push handle assembly
101 Vertical support member
103 Uppermost (highest) end
105 Lowermost (lowest) end
107 Push handle
110 Wheel receiving means
111 Spring-loaded pin
120 Armrest and push handle assemblies receiving means
121 Quick release clamp
130 Wheel assembly
131 Front wheels
133 Rear wheels
D1 First dimension (depth)
D2 Second dimension (width)
D3 Third dimension (height)
H Overall height of frame

DETAILED DESCRIPTION

Figure 2A:
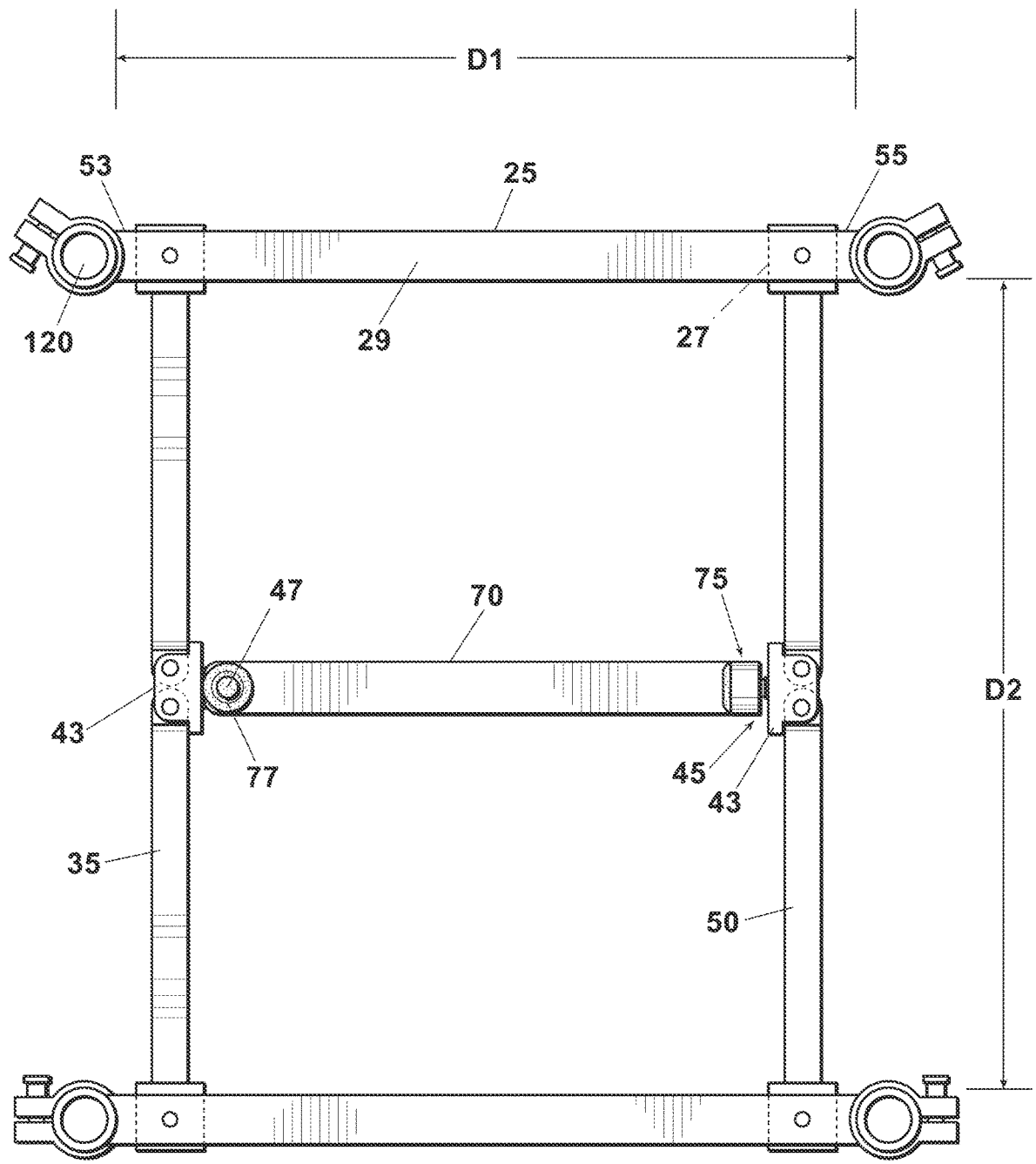
FIG. 2a is view of the frame taken along section line 2-2 of FIG. 1, the seat and back panels, arms, and wheels being removed to reveal the frame structure.
Figure 2B:
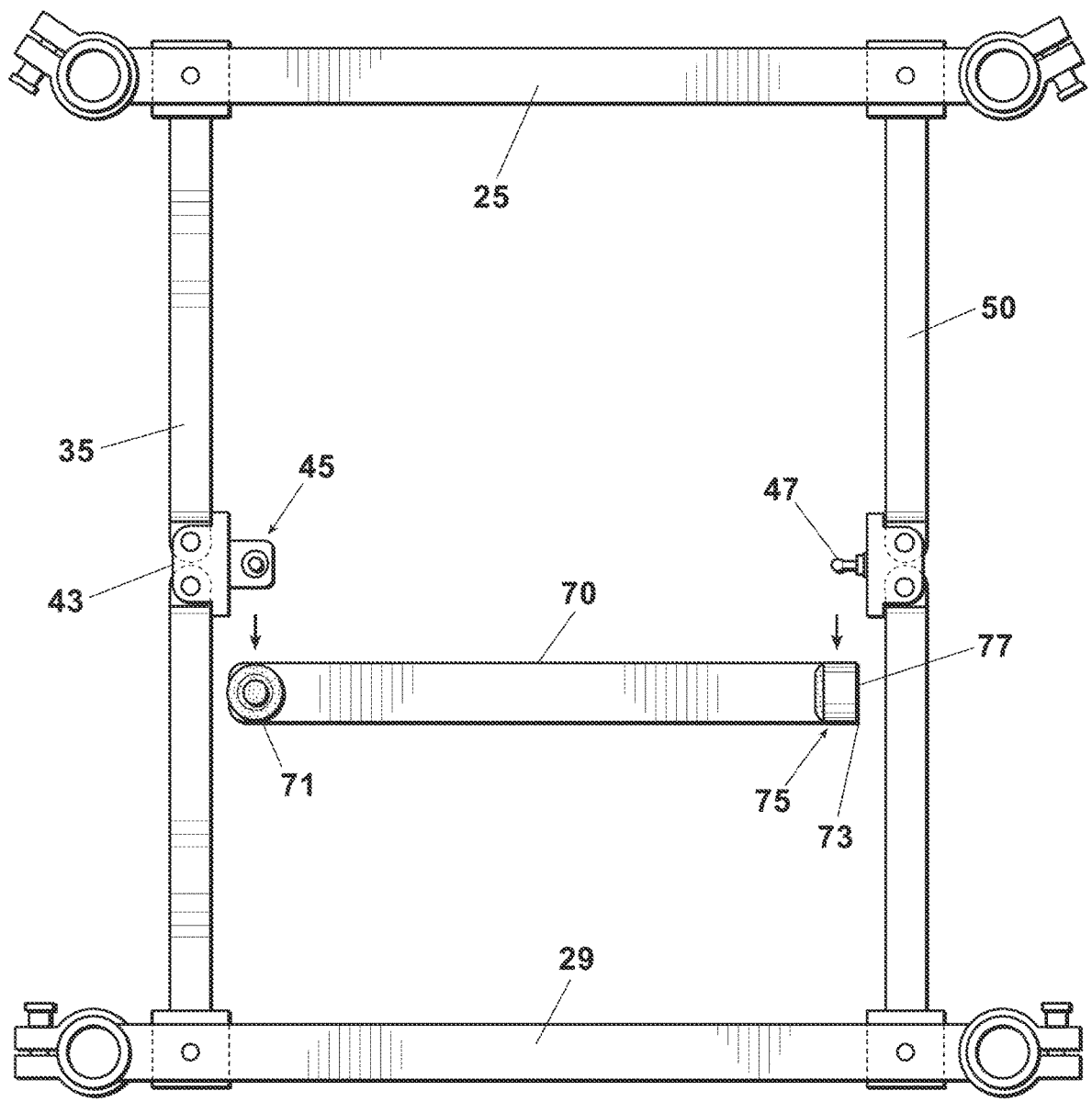
FIG. 2b is a view of the frame of FIG. 2a with the locking bar being removed.
Figure 3:
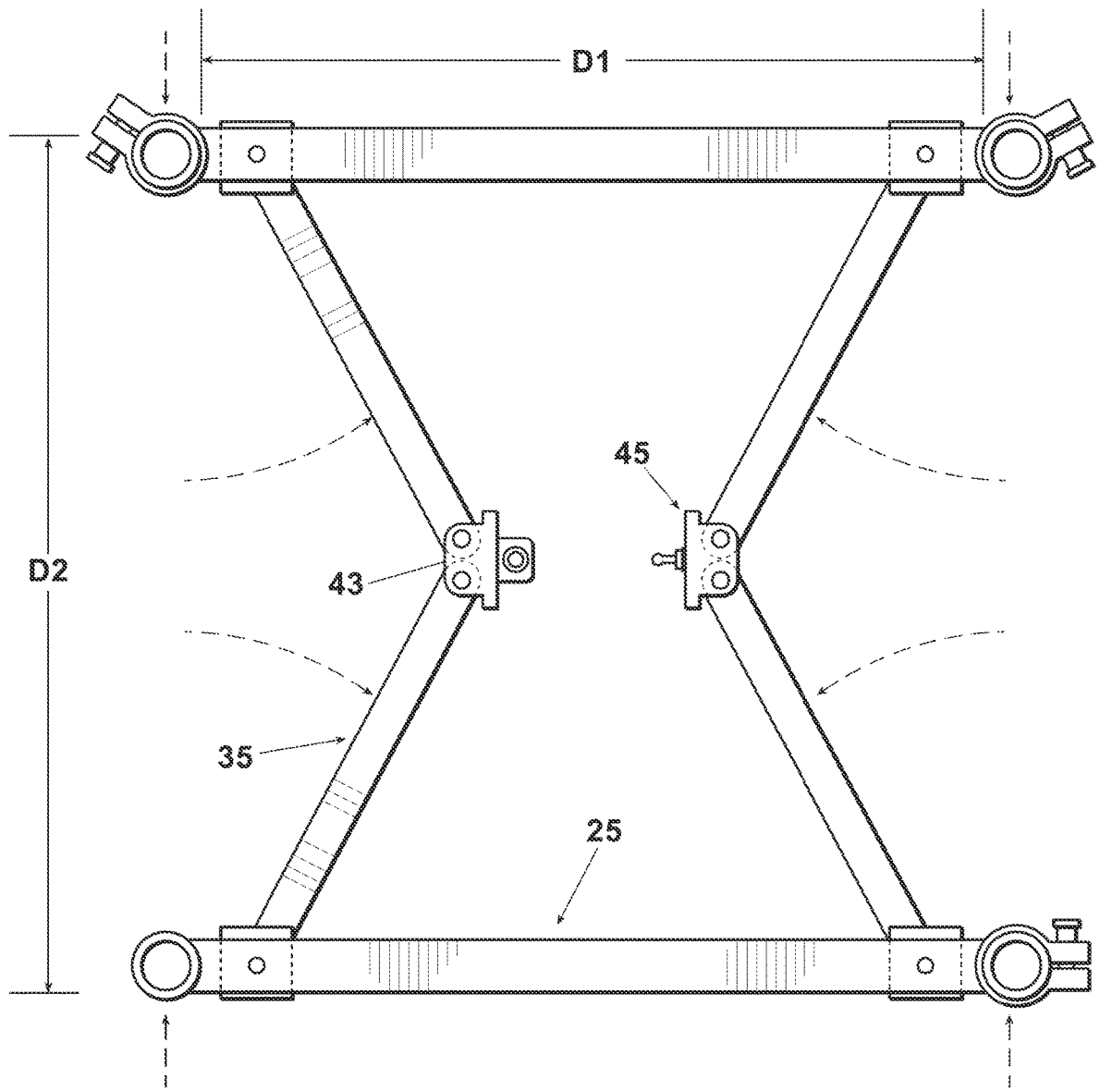
FIG. 3 is a top plan view of the frame as it transitions from its unfolded (fully deployed) to folded (collapsed, fully stowed) state.
Figure 4:
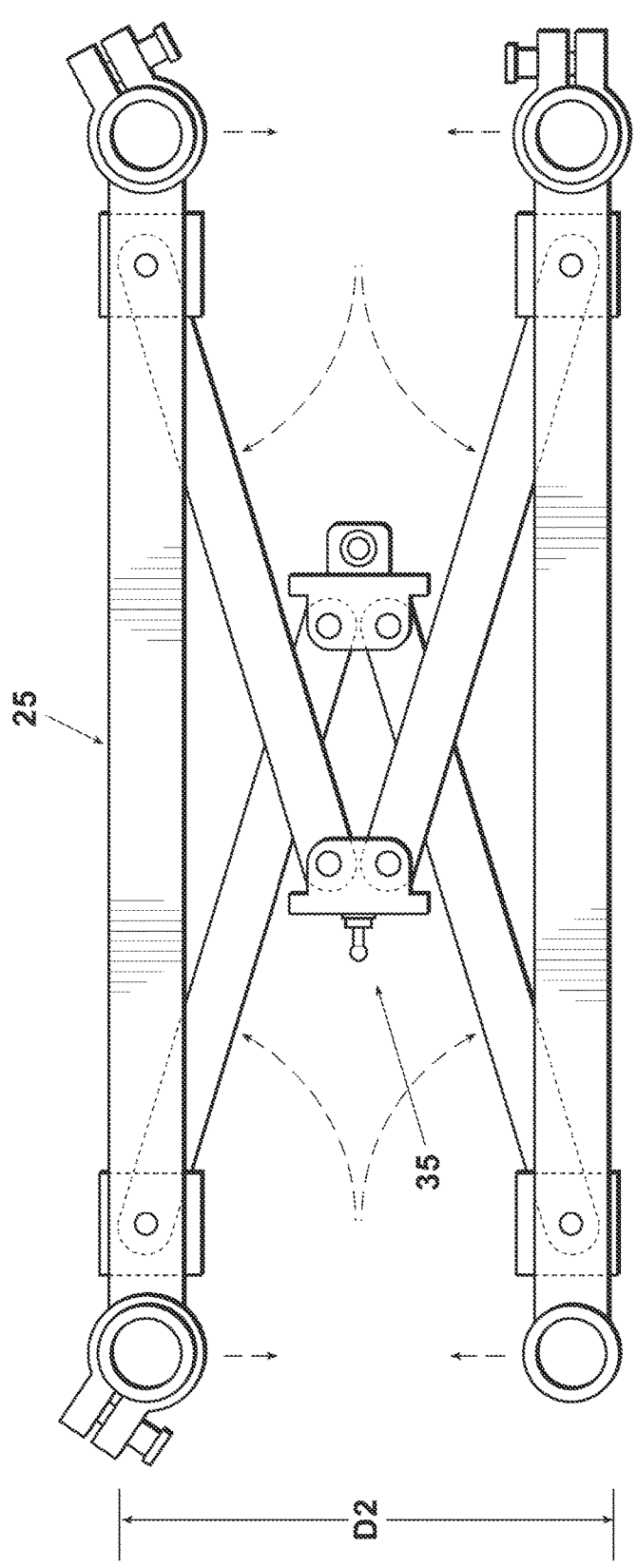
FIG. 4 is another top plan view of the frame as it continues its transition between the unfolded and folded states.
Figure 5:
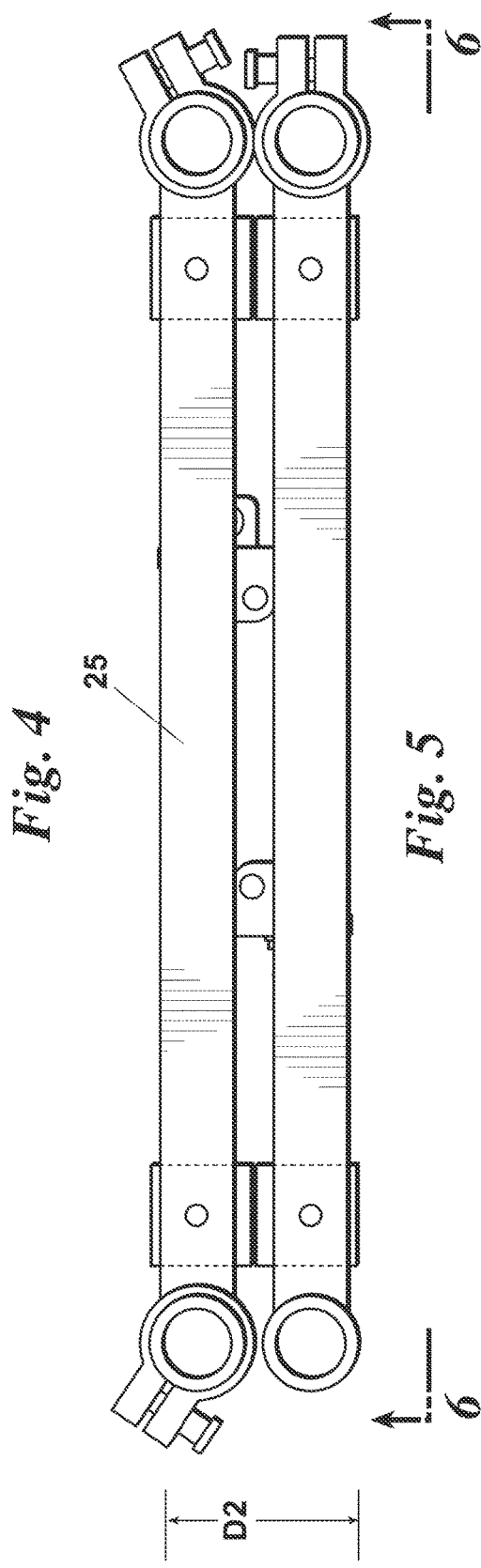
FIG. 5 is a top plan view of the frame in its folded state.
Figure 6:
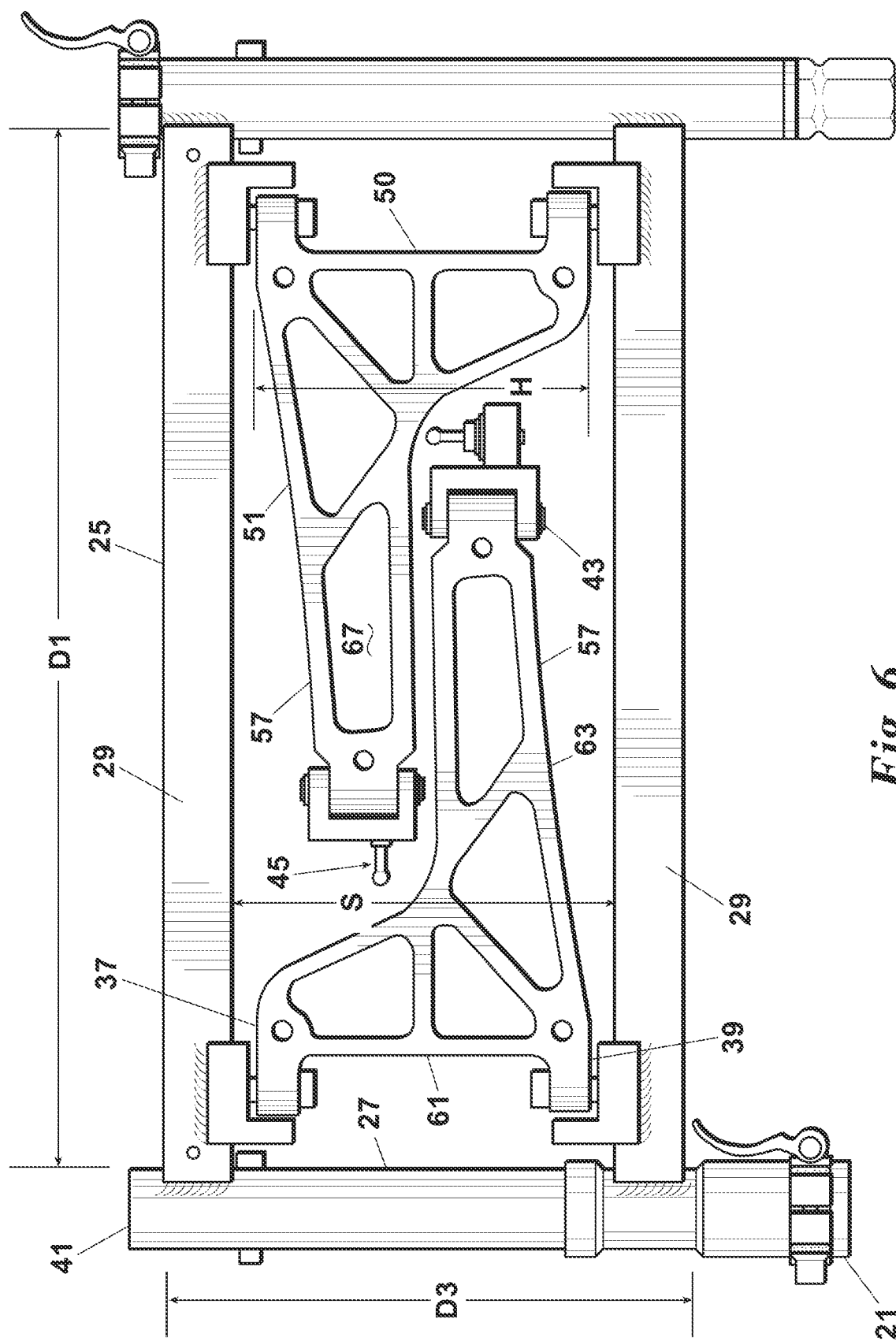
FIG. 6 is a view taken along section line 6-6 of FIG. 5.
Figure 7:
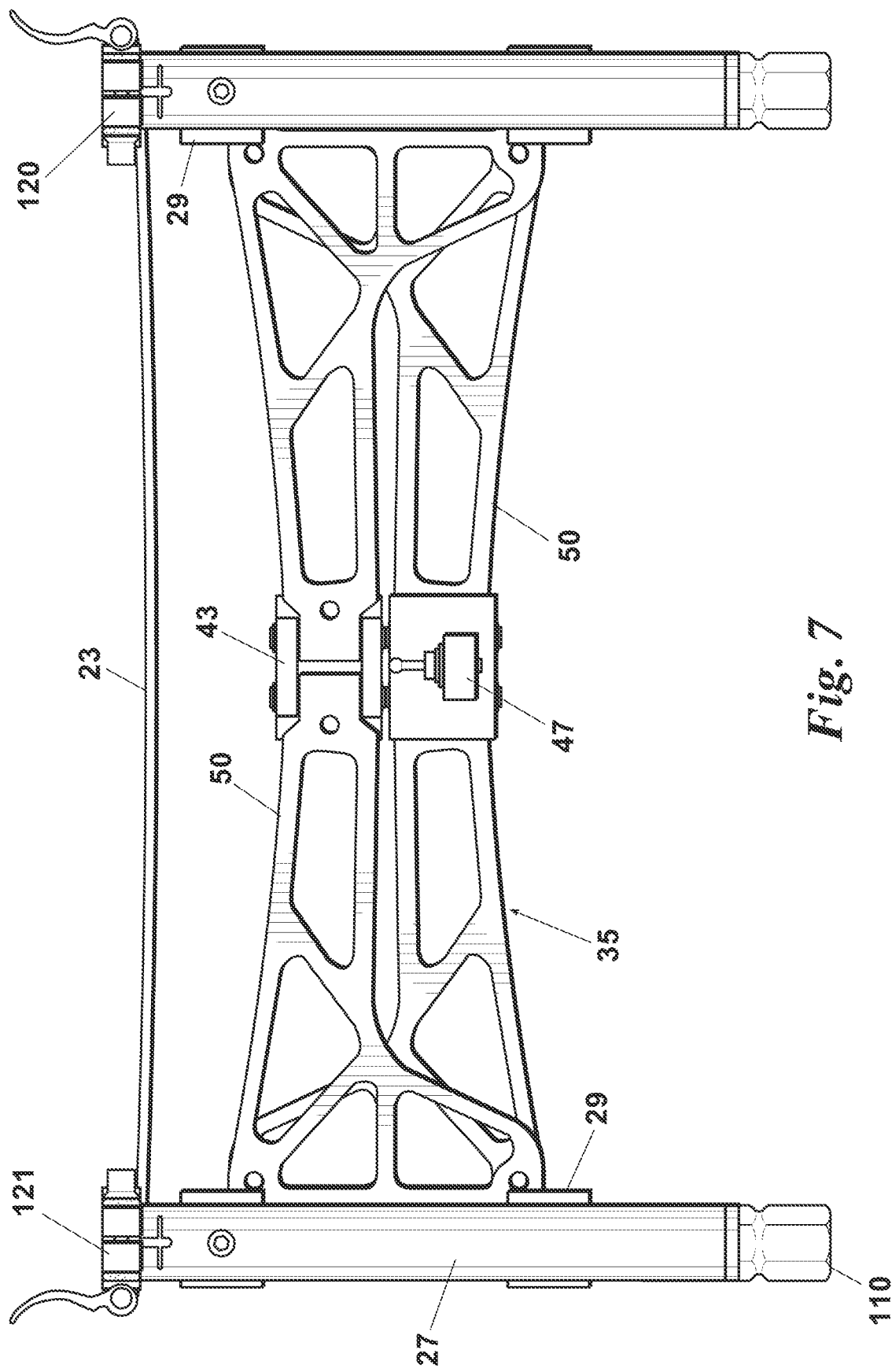
FIG. 7 is view of the frame taken along section line 7-7 of FIG. 1.
Figure 13:
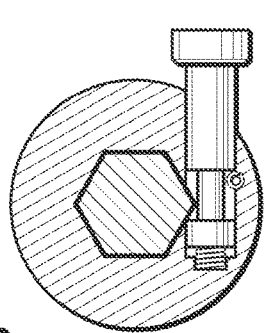
FIG. 13 is a view taken along section line 13-13 of FIG. 12.
Figure 15:
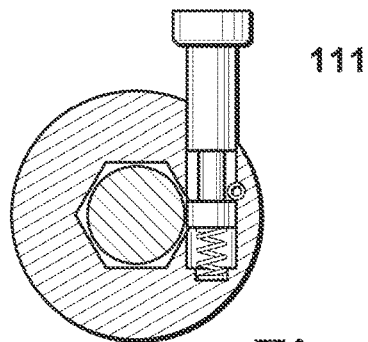
FIG. 15 is a view taken along section line 15-15 of FIG. 14.
Figure 12:
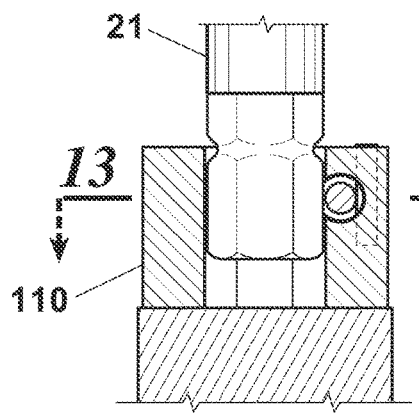
FIG. 12 is a cross-section view of the wheel receiving means of FIG. 9.
Figure 14:
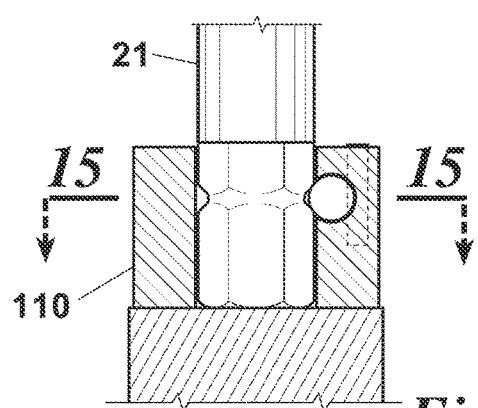
FIG. 14 is a cross-section view of the wheel receiving means of FIG. 11.

Referring first to FIGS. 1-7, embodiments of a transport chair 10 of this disclosure include a frame 20 that is moveable between a stowed state and a deployed state, the armrest assembly 80, push handle assembly 100, and wheel assembly 130 connectable to, and detachable from the frame. Wheel receiving means 110 are located at a lowest end 21 of the frame 20 and armrest and push handle assemblies receiving means 120 are located at a highest end 41 of the frame 20. The wheel receiving means 110 may include a quick release clamp 121 to temporarily secure the front (swivel) wheels 131 and a spring-loaded pin 111 to temporarily secure the rear (fixed) wheels 133 to the frame 20. See e.g,. FIGS. 8 to 15. In embodiments, the rear wheels 133 may be larger wheels than those of the front wheels 131 and, if so, the rear wheel receiving means 110 would be located higher than those of the front wheels 131 and mounted transverse to the frame 20.

During assembly and disassembly of the chair 10, front and rear wheels 131, 133 and the armrest and push handle assemblies 80, 100 are inserted into their corresponding receiving means 110, 120. The armrest assembly 80 is connectable to, and detachable from, the push handle assembly 100. A seat back panel (not shown) may be attached to the push handle assembly 100. The seat back panel may be the same or similar to that disclosed in US 2018/0168898 A1. A seat panel 23 may be attached to the frame 20.

The frame 20 includes a pair of fixed sides 25 (first and second fixed sides) arranged opposite one another. A vertical support member 27 is located at each end 53, 55 of the fixed side 25 and a pair of spaced-apart, horizontal rails 29 extends between the vertical support members 27. The ends 21, 41 of the vertical support member 27 may extend past a corresponding one of the rails 29, making the height of the vertical support member 27 the overall height of the frame 20. The lowest end 21 of the vertical support member 27 serves as, or accommodates, the wheel receiving means 110 for the wheels 131, 133 and the highest end 41 serves as, or accommodates, the armrest and push handle assemblies receiving means 120. The uppermost rail 29 supports the seat panel. spaced from one another and connected to the supports 27.

The fixed sides 25 define a first dimension "D1" of the frame 20. This first dimension D1 may be a front-to-back depth of the frame 10, assuming the fixed sides 25 are arranged as the left and right sides of the transport chair 10. Because this first dimension D1 is defined by the fixed sides 25, it remains a same size whether the frame 20 is in the stowed state or the deployed state. Another dimension "D3" of the frame 10 is defined at least partly by a spacing "S" between the pair of rails 29, the spacing remaining a same size when the frame 20 is the stowed state and the deployed state. This dimension D3 may be the overall height of the frame 20.

In addition to the fixed sides 25, the frame 20 includes a pair of hinged sides 35 (first hinged side and second hinged side) arranged opposite one another and pivotally mounted at their upper and lower ends 37, 39 to a corresponding rail 29 of the fixed sides 25. The hinged sides 35 define a second dimension "D2" of the frame 20. This second dimension D2 may be a side-to-side width of the frame 20, assuming the hinged sides 35 are arranged as the front and back sides of the frame 20. Because this second dimension D2 is defined by the hinged sides 35, it is a different size when the frame 20 is in the stowed state than when it is in the deployed state, D2 being less in size when stowed than when deployed. When in the stowed state, each hinged side 35 fits within the spacing S between a corresponding rails 29. In other words, a total or overall height "H" of the hinged sides 35 is less than the spacing S.

In embodiments, the hinged sides 35 each include a pair of cross-members 50 and a hinge 43 located between the pair of cross-members 50. Each hinge 43 is arranged such that its corresponding cross-members 50 fold inwardly relative to the frame 20. Because the cross-members 50 of one hinged side 35 are inverted relative to the cross-members 50 of the other hinged side 35, when the frame 20 is in the stowed state, a portion 57 of the cross-members 50, and therefore the hinged sides 35, overlap one another.

Figure 24:
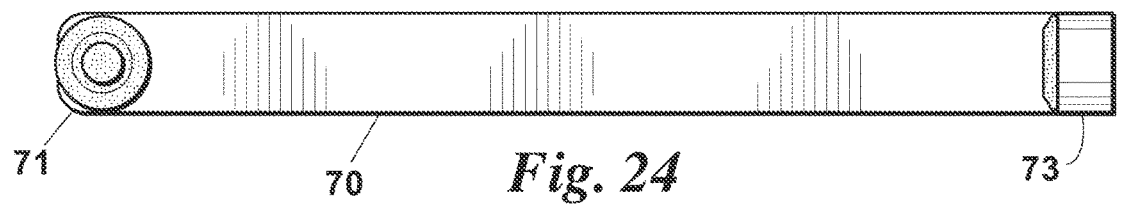
FIG. 24 is a top plan view of the locking bar of FIG. 21.
Figure 21:
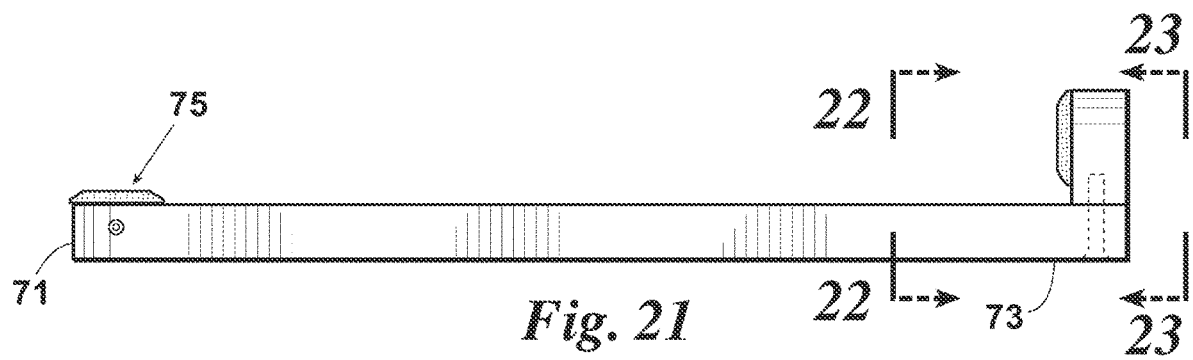
FIG. 21 is a front elevation view of the locking bar of FIG. 1.
Figure 25:
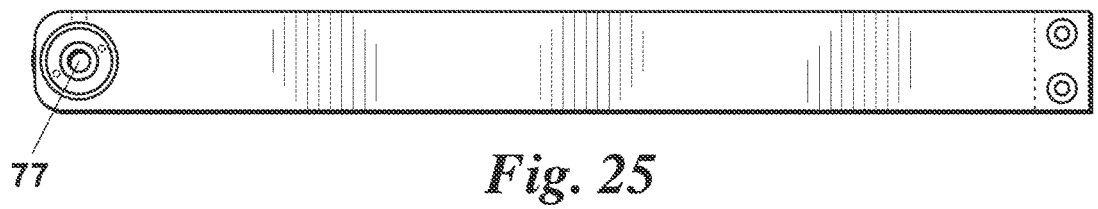
FIG. 25 is a bottom plan view of the locking bar of FIG. 21.
Figure 22:
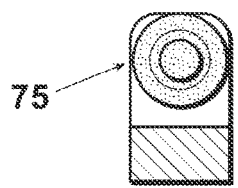
FIG. 22 is a view taken along section line 22-22 of FIG. 21.
Figure 23:
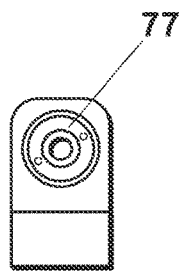
FIG. 23 is a view taken along section line 23-23 of FIG. 21.

To prevent the hinged sides 35 from folding or collapsing during use, a bar 70 extends between the hinged sides 35 when the frame 20 is in its deployed state. In embodiments, the bar 70 is connectable to, and detachable from, each hinge 43. Because the cross-members 50 of each hinge side 35 are inverted relative to the other, the bar 70 has a first end 71 at a first elevation and a second end 73 at a second elevation different than that of the first elevation, there being a step, jog, or rise 79 between the two ends 71, 73. See e.g. FIGS. 21-25. In embodiments, the bar 70 may be L-shaped in cross-section.

The hinges 43 and the first and second ends 71, 73 of the bar 70 include connecting means 45, 75 corresponding to one another. The connecting means 75 at the first end 71 of the bar 70 is arranged orthogonal to those at the second end 73 and the corresponding connecting means 45 of the hinge 43 has a same orientation as that of an opposing first or second end 71, 73 of the bar 70. In embodiments, the connecting means 45, 75 may be a pin 47 and a pin receiver 77. The bar 70 is sized to prevent the connecting means 45, 75 from disconnecting during use of the chair 10, and the hinge 43 prevents outward movement of the cross-members 50.

Each cross-member 50 may be a truss-shaped member, having supports 51 arranged at predetermined angles to another and forming spaces or voids 67 between the supports 51 (which also helps to reduce the weight of the frame 20). The truss-shape may include at least one diagonally oriented support 51 within a perimeter 69 of the cross-member 50 and may also include at least one horizontally or vertically oriented support 51 within its perimeter 69. In embodiments, the cross member 50 may be generally L-shaped, with a shorter leg 61 of the L-shape being generally vertical, the longer leg 63 of the L-shape being arranged at an oblique angle relative to horizontal.

Figure 17:
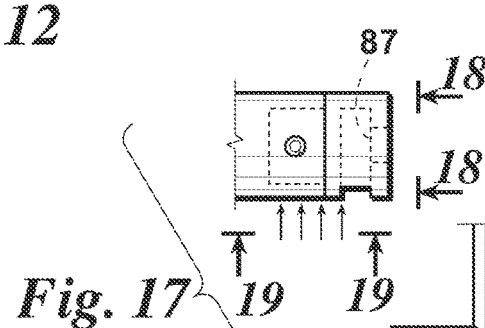
FIG. 17 is an exploded assembly view of FIG. 16.
Figure 18:
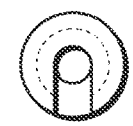
FIG. 18 is a view taken along section line 18-18 of FIG. 17.
Figure 16:
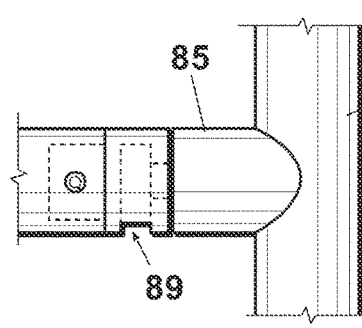
FIG. 16 is an enlarged view of section 16 of FIG. 1.
Figure 19:
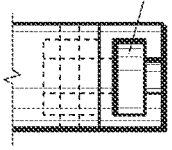
FIG. 19 is a view taken along section line 19-19 of FIG. 17.
Figure 20:
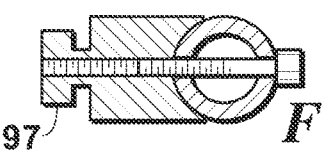
FIG. 20 is a view taken along section line 20-20 of FIG. 17.

The transport chair 10 may include an armrest assembly 80 including a horizontal member 81 and a vertical support member 91, 101 at or toward each forwardmost and rearward-most end 83, 85 of the horizontal member 81. See e.g., FIGS. 16-20. In embodiments, the horizontal member 81, which may be padded, has a slot 87 with an open bottom 89 located toward the rearward-most end 85. The slot 87 is sized to receive a T-shaped connector 97 located toward a lowermost end 95 of a vertical support member 91. The vertical member 101 forms part of a push handle assembly 100 that includes push handles 107 toward its uppermost end 103. This vertical support member 101, as well as vertical member 91 of the armrest assembly 80, are sized for insertion at their lowest ends 95, 105 into the armrest and push handle assemblies receiving means 120 of the frame 20. A quick release clamp 121 may be used to temporarily secure the members 91, 101 to the frame 20. The armrest assembly 80 is moveable between a connected state to the push handle assembly 100, in which the T-shaped connector 97 resides within the slot 87, and an unconnected state, in which the T-shaped connector 97 does not reside within the slot 87.

While embodiments of a transport chair of this disclosure have been described in detail, those of ordinary skill can devise variations of the chair without departing from the scope of the following claims, the recited elements of which being entitled to their full range of equivalents.

What is claimed:

1. A transport chair frame comprising:
   a first fixed side and a second fixed side, each fixed side arranged opposite one another and defining a first dimension of the transport chair frame, the first dimension being a same size when the transport chair frame is in a stowed state and a deployed state;
   a first hinged side and a second hinged side, each hinged side arranged opposite one another, pivotally mounted to a corresponding one of the fixed sides, and defining a second dimension of the transport chair frame, the second dimension being a different size when the transport chair frame is in the stowed state than when it is in the deployed state;
   the first and second hinge sides of the transport chair frame each including:
   a pair of cross-members; and
   a hinge located between the pair of cross-members, each hinge arranged such that its corresponding cross-members fold inwardly relative to the transport chair frame;
   the cross-members of the first hinged side being inverted relative to the cross members of the second hinged side and arranged such that when the transport chair frame is in the stowed state, a portion of the first hinged side overlaps a corresponding portion of the second hinged side;
   the transport chair frame further including:
   a bar extending between the first and second hinged sides and connectable to, and detachable from, each hinge; the bar having a first end at a first elevation and a second end at a second elevation different than that of the first elevation;
   wherein, the bar when connected to the first and second hinged sides locks the frame in the deployed state and prevents the transport chair frame from moving to the stowed state.

2. The transport chair frame of claim 1, wherein, the hinges and the first and second ends of the bar include a pin and a pin receiver corresponding to one another; the pin and a pin receiver at the first end of the bar being arranged orthogonal to those at the second end, the pin and a pin receiver of each hinge having a same orientation as that of an opposing first or second end of the bar.

3. The transport chair frame of claim 1, further comprising, each cross-member being a truss-shaped member.

4. The transport chair frame of claim 3, wherein, each cross-member includes at least one diagonally oriented support within its perimeter.

5. The transport chair frame of claim 3, further comprising, each cross member including at least one horizontally oriented support within its perimeter.

6. The transport chair frame of claim 1, further comprising, each cross member being L-shaped.

7. The transport chair frame of claim 6, wherein, a shorter leg of the L-shape is vertical, the longer leg of the L-shape is oblique relative to horizontal.

8. The transport chair frame of claim 1, further comprising:
   each fixed side including an upper rail and a lower rail;
   wherein a third dimension of the transport chair frame is defined at least partly by a spacing between the upper and lower rails, the spacing remaining a same size when the frame is the stowed state and the deployed state.

9. The transport chair frame of claim 8, wherein, a total height of the first and second hinged sides is less than the spacing between corresponding ones of the upper and lower rails.

10. The transport chair frame of claim 1, wherein, the first dimension is a front-to-back depth of the frame and the second dimension is a side-to-side width of the frame.

11. The transport chair frame of claim 1, further comprising:
   an armrest assembly including a horizontal member having a slot with an open bottom located toward one end of the horizontal member; and
   a push handle assembly including a vertical member having a T-shaped connector sized for insertion to the slot;
   wherein the armrest assembly is moveable between a connected state, in which the T-shaped connector resides within the slot, and an unconnected state, in which the T-shaped connector does not reside within the slot.

12. The transport chair frame of claim 11, further comprising:
   a seat back panel connectable to the vertical member of the push handle assembly.

13. The transport chair frame of claim 11, further comprising:
   the vertical member of the push handle assembly including a push handle.

14. The transport chair frame of claim 1, further comprising:
   an armrest and push handle assembly connectable by way of a quick release clamp to an upper end of the frame.

15. The transport chair frame of claim 1, further comprising, a pair of wheels adapted for insertion into a lower end of the transport chair frame by way of a quick release clamp.

16. The transport chair frame of claim 1, further comprising, a pair of rear wheels adapted for insertion into a lower end of the transport chair frame by way of a spring-loaded pin.

17. The transport chair frame of claim 1, wherein, when in the stowed state, the transport chair frame fits within an envelope 9 inches deep×14 inches wide×22 inches long.

18. The transport chair frame of claim 1, further comprising:
- front and rear wheels connectable to a lower end of the transport chair frame; and
- armrest and push handle assemblies connectable to an upper end of the transport chair frame;
- a seat bottom connectable to the fixed sides of the transport chair frame;
- a seat back connectable to the push handle assemblies; and
- quick connect/disconnect fasteners selected from the group consisting of pins and clamps for connecting the front wheels, the rear wheels, and the armrest and push handle assemblies to the transport chair frame.

19. The transport chair frame of claim 18, wherein, the transport chair frame, the front and rear wheels, the armrest and push handle assembles, the seat bottom, the seat back, and the quick connect/disconnect fasteners comprise a kit of parts to be assembled by a user into a transport chair for use and then disassembled after the use.

* * * * *